United States Patent [19]

Steiner

[11] 4,139,343

[45] Feb. 13, 1979

[54] HEAT TRANSFER INK, SHEET, PROCESS AND PRINTED FABRIC

[75] Inventor: Russell I. Steiner, Reading, Pa.

[73] Assignee: Crompton & Knowles Corporation, New York, N.Y.

[21] Appl. No.: 807,116

[22] Filed: Jun. 16, 1977

[51] Int. Cl.$^2$ .................. D06P 1/04; D06P 5/00; C09D 11/02; C09B 29/38
[52] U.S. Cl. ............................ 8/2.5 A; 8/26; 106/22; 260/163; 8/2.5 R
[58] Field of Search ............... 8/2.5 R, 2.5 A; 106/22

[56] References Cited

U.S. PATENT DOCUMENTS

| | | | |
|---|---|---|---|
| 2,228,303 | 1/1941 | Fischer | 260/163 |
| 3,019,217 | 1/1962 | Joyce | 260/163 |
| 3,198,783 | 8/1965 | Lewis | 260/163 |

FOREIGN PATENT DOCUMENTS

| | | | |
|---|---|---|---|
| 2106085 | 8/1971 | Fed. Rep. of Germany | 260/163 |
| 1771812 | 2/1972 | Fed. Rep. of Germany. | |
| 44-14107 | 6/1969 | Japan | 260/163 |
| 1001496 | 8/1965 | United Kingdom | 8/2.5 A |
| 1249350 | 10/1971 | United Kingdom | 8/2.5 A |

OTHER PUBLICATIONS

French Patents Abstracts, vol. 7, No. 16, p. 2, (1967).

*Primary Examiner*—Donald E. Czaja
*Assistant Examiner*—Maria S. Tungol
*Attorney, Agent, or Firm*—William H. Elliott, Jr.

[57] ABSTRACT

The invention is directed to transfer sheets for heat transfer printing polyester textiles in yellow hues, to inks that are useful in making such transfer sheets, to an improved process for heat transfer printing polyester textiles and to the printed or dyed fabrics thereby produced; the yellow hue being imparted by the use of at least one compound having the structure:

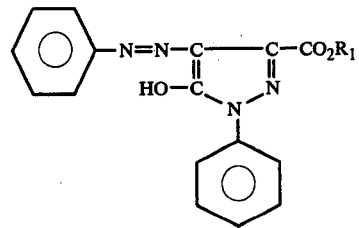

wherein $R_1$ is lower alkyl.

9 Claims, No Drawings

HEAT TRANSFER INK, SHEET, PROCESS AND PRINTED FABRIC

This invention relates to transfer sheets that are useful in heat transfer printing of textile fabrics, to ink that are useful in making the transfer sheets, to an improved process for the heat transfer printing of polyester fabrics, and to the printed or dyed fabrics produced thereby. Various well known techniques (such as melt transfer and wet transfer) have heretofore been used to produce transfer prints but they had not been widely utilized in commercial fabric printing operations. In the late 1950's the French firm, Filatures Prouvost Masurel et Cie, pioneered the development of a dry transfer printing process, referred to variously as the vapor-phase process, the dry heat process or the sublimation process; the use of this process is in a stage of continuing rapid growth and it is described in great detail in published literature and patents — e.g., British Specification No. 1,189,026 discloses an early embodiment of the process.

In this application the terms "thermal transfer process" and "heat transfer process" will be used interchangeably, but shall only refer to the sublimation or vapor-phase process of printing or dyeing synthetic textile fabrics wherein textiles are colored with water-insoluble dyestuffs that undergo sublimation at temperatures below that at which the physical integrity of the textile is impaired. The dyeing or printing is carried out by preprinting a substrate (usually paper or a sheet of non-textile material) in an all-over or discontinuous pattern with an ink that contains the sublimable dyestuff. The preprinted substrate and the textile to be dyed or printed are brought into contact under controlled conditions of time, temperature and pressure whereby the dye on the substrate is caused to sublime or be vaporized onto the surface of the fabric, to penetrate into the fibers and to be entrained therein. Thereafter, the substrate and the dyed or printed textile are separated.

Water-insoluble dyestuffs that undergo sublimation in the operating range of the heat transfer process are not all useful in such process as they do not necessarily also possess or exhibit other performance properties that enable their utilization in commercial heat transfer printing operations.

Accordingly, it is an object of the present invention to provide an improved thermal transfer printing process to impart clear, brilliant yellow pattern effect to polyester, nylon and acrylic textiles that exhibit unusually good strength, light fastness, tinctorial transfer and build-up properties.

It is another object of this invention to provide improved thermal transfer sheets for use in the aforesaid improved thermal transfer process.

It is yet another object of the invention to provide printing inks that are useful in making the aforesaid transfer sheets.

Other objects and advantages of the invention will be apparent from the ensuing description and the appended examples.

The objects and advantages of this invention are achieved by using at least one compound having the structure

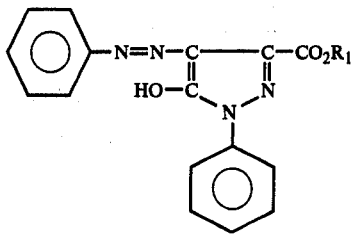

(wherein $R_1$ is lower alkyl — especially methyl, ethyl and propyl) as a sublimable dye to produce heat transfer pattern effects on polyester, nylon and acrylic textile fibers; by transfer sheets carrying a dried ink film adapted to heat transfer printing that contains at least one such pyrazolone dye; by ink preparations for heat transfer printing applications that contain at least one such pyrazolone dye; and by the printed fabrics produced thereby.

As used herein the following terms shall hereafter be deemed to have the following meanings:
(a) "Pattern effects" shall be construed as referring to continuous (all-over) effects as well as discontinuous (localized) effects.
(b) "Polyester textile" and "polyester fabric" shall be construed as referring to textiles and fabrics made up entirely or predominantly of polyester fibers.
(c) "Transfer sheet" shall be construed as referring to an insoluble non-textile substrate (normally, but not necessarily, paper) in sheet, roll or web form having a pattern effect printed thereon with a dried film of an ink formulation adapted for use in the heat transfer printing of synthetic textiles.
(d) "Compatible dyestuffs" and "compatible sublimable dyestuffs" shall be construed as meaning water-insoluble disperse dyes or pigments or fluorescent brighteners that have essentially the same sublimability and thermal transfer characteristics as the dyes of this invention. Thus they desirably should have the same relative energy level and transfer at the same rate for a given temperature within the operating range of the heat transfer process employed.

A great many disperse dyes and pigments that are capable of coloring polyester and cellulose ester fibers when applied by usual aqueous dispersion dyeing processes also possess the volatility or sublimation characteristics that are needed to function effectively in the heat transfer process — i.e., water-insoluble dyes that are free of ionogenic groups (such as —COOH and —SO$_3$H) that inhibit sublimation, that have a molecular weight of about 230 to 400, that sublime at about 150° to 225° C. — preferably at 190° to 215° C. — (hereinafter such dyes are sometimes referred to as "sublimable dyes"). The dyes also should not migrate from the dyed textile to any appreciable degree at temperatures below about 125° C. so that the resulting transfer printed fabric can be pressed with a hot iron without "bleeding" (causing color migration). Dyes that volatilize at temperatures below about 150° C. have a tendency to vaporize too rapidly and do not produce sharply defined patterns because of flushing. Dyes that volatilize between 150° C. and 190° C. can be used but frequently they give rise to ring dyeing by superficially coloring only the outermost surface of the fiber. Dyes that volatilize at temperatures above about 225° C. tend to be unsatisfactory because this temperature approaches the 1st degree transition temperature at which most of the currently used synthetic fibers soften to a point where the fabric integrity is lost or its physicals are impaired. Further the rate of volatilization should be such that optimum color transfer can be obtained within the contact time normally employed in the thermal transfer printing process — i.e., within about 15 to 45 seconds and usually about 30 seconds.

Whether or not a particular dyestuff is possessed of the requisite volatility or sublimability for use in the heat transfer process, can be determined by using a heating device of the type used to determine color fastness to dry heat (Test Method 117 — 1966T of the American Association of Textile Chemists and Colorists) and evaluating the color transference dye under various predetermined time, temperature and pressure conditions.

In the evaluation, a paper test sheet is printed with an ink containing the dye to be tested. A piece of uncolored fabric of the type to be printed is placed in close contact with the printed face of the paper and the composite positioned in the heated device and heated (e.g. 30 seconds at a constant temperature between 150° to 220° C. and under a constant pressure of about $40 \pm 10$ g./cm$^2$). The difference between the amount of dyestuff originally on the paper and the amount remaining after the transfer printing process has been completed can be measured and converted to a percentage value. The dyes that show a high degree of color transference from the printed test paper to the fabric under conditions comparable to those that will be utilized in the full scale heat transfer printing equipment, have the requisite volatility or sublimation characteristics for use in such applications. However, they will not necessarily possess other desirable attributes for use as dyes in the heat transfer process — such as light and wet fastness, bleeding resistance at temperatures below 120° C., ability to withstand dry cleaning, and resistance to perspiration, crocking, and gas fading.

One group of compounds that can dye synthetic fabrics from aqueous dispersion but whose utility as dyes for use in heat transfer printing has heretofore not been established are the pyrazolone disperse dyes for nylon, polyester and acrylic fibers prepared by diazotizing aniline and coupling the resultant diazonium salt with a 1-phenyl-3-carbalkoxy-5-pyrazolone.

I have found that the pyrazolone dyes having the structure

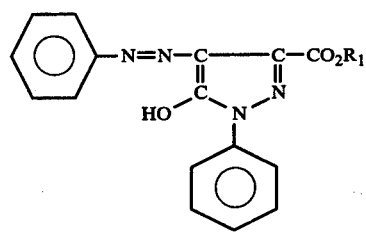

(Structure I)

wherein $R_1$ is lower alkyl — preferably methyl, ethyl or propyl — have unexpectedly been found to impart an excellent degree of thermal transfer of tinctorial values and build-up characteristics to polyester, nylon and acrylic fibers in the usual heat transfer process working range and also give attractive brilliant yellow shades with excellent light and wet fastness properties, when applied to nylon, acrylic and polyester fabrics by such technique. Transfer dyeings made with these pyrazolone dyes are of superior tinctorial strength when applied in light concentration to form pastel colors as well as when applied in heavy concentration and their fastness properties in pastel shades is unusually high. They also have an energy level that makes them compatible and useable with many other conventional heat transferable dyestuffs.

The Structure I dyes can be prepared by diazotizing and coupling aniline (by conventional methods) to a 1-phenyl-3-carbalkoxy-5-pyrazolone — such as: 1-phenyl-3-carbmethoxy-5-pyrazolone; 1-phenyl-3-carbethoxy-5-pyrazolone; and 1-phenyl-3-carbpropoxy-5-pyrazolone, etc.

Tinctorially, and performance-wise, the dyes prepared by this synthetic route are outstanding as dyes for use in the heat transfer process. This is especially true of the Structure I compound where $R_1$ is ethyl.

In use, the specified pyrazolone dye is dispersed in an ink base formulation including a vehicle (of either the aqueous or solvent type) and a film-forming binder adapted to the type of printing operation to be used in printing the transfer sheet — i.e., gravure, flexographic, lithographic offset or rotory screen — and printed on the substrate — usually a paper sheet or web. The problems incident to paper selection and to the manufacture and formulation of ink bases (including the selection of appropriate vehicles, solvents, binders, thinners, etc. used to make the ink base) that are suitable for use in the printing on the heat transfer substrates by the various printing techniques are all well understood in the art and no special or unique problems arise by virtue of the use of the specified pyrazolone dyes in such formulations.

The dyes in the ink formulation used in producing the substrate should preferably be free of dispersants and ground to a particle size that can be readily dispersed in the vehicle — preferably less than 3 microns in size. When used in ink systems with other compatible sublimable dyes or optical brighteners, they, too, should preferably be dispersant fee and have the same order of particle size as the specified pyrazolone dye component.

The following example will illustrate the various aspects of the invention, namely: (a) an ink formulation (a solvent type vehicle — for gravure printing); (b) the transfer sheet and (c) the improved heat transfer process.

EXAMPLE I (a) A gravure ink with a viscosity of 22 seconds on a #2 Zahn cup, was made using:

|  | Parts by Weight |
|---|---|
| A Structure I dye in which $R_1$ is ethyl - namely:5 - hydroxy - 1 - phenyl - 4 - (- phenylazo) - pyrazole - 3 - carboxylic acid, ethyl ester. | 4 |
| Vehicle (80% Ethanol; 20% Toluol) | 36.8 |
| Binder (Ethyl Cellulose) | 9.2 | by grinding the ingredients in a shot mill to a particle size under 3 microns. Additional solvent was added to reduce the color content to 4%.

(b) To make the transfer sheet, the resulting ink was printed on a standard gravure base paper stock using a Standard Geiger gravure production and proofing press with an engraved cylinder 150 cells/linear inch. The printed transfer sheet was allowed to dry.

(c) An undyed piece of texturized polyester fabric was placed on the printed face of the dried transfer sheet and the composite was positioned between two platens under conventional heat transfer operating pressure and heated for 30 seconds at 205° C. Thereafter the fabric and used transfer sheet were separated. The polyester fabric was dyed in a clear brilliant yellow hue of excellent tinctorial strength and fastness properties.

All fastness tests were conducted in accordance with AATCC Standard Test Methods where applicable:

Light Fastness: Fade-O-Meter — AATCC Test Method 16A-1971
Wash Fastness: Test #2A— AATCC Test Method 61-1972
Sublimation Test: AATCC Test Method 117-1973
Perspiration: Test speciments were evaluated for resistance to acids by AATCC Test Method 15-1973
Crocking: AATCC Test Method 8-1972.

The results are tabulated below. The table gives numerical values to the tests described above, using the usual AATCC numerical ratings running from 5 to 1; in which 5 represents no or negligible change, 4 represents a slight change, 3 represents a noticeable change, 2 represents considerable change and 1 represents much change:

TABLE 1

| Light | | Fade-O-Meter (60 hours) # 2A Wash | 5 Perspiration Acid |
|---|---|---|---|
| Alteration | | 4–5 | 4–5 |
| Staining | | | |
| Acetate | | 5 | 5 |
| Cotton | | 5 | 5 |
| Nylon | | 4–5 | 5 |
| Dacron (Polyester) | | 5 | 5 |
| Orlon (Acrylic) | | 5 | 5 |
| Wool | | 5 | 5 |
| Crock Test | | | |
| | Wet | – 5 | |
| | Dry | – 5 | |
| Sublimation | | | |
| | 340° F/30" | – 4 | |
| | 385° F/15" | 3–4 | |

German OLS No. 1,771,812 has suggested that a somewhat similar dye C.I. Solvent Yellow 16 can be used to impart yellow colors by the heat transfer process. Solvent Yellow 16 has the structure:

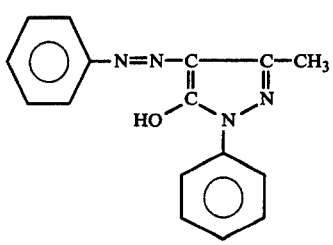

However, dyeings made therewith exhibit rather poor lightfastness — in a comparable depth dyeing show a lightfast break quickly in the Fade-O-Meter and by 60 hours have a 2 rating. In addition Solvent Yellow 16 is of low tinctorial strength and is not satisfactory for heat transfer in pastel shades and in addition does not exhibit the build up properties of the Structure I dyes.

Table 2 gives the percent of dyestuff transferred from the transfer paper (having a 4% pigment loading) to the texturized polyester substrate at temperatures of 380° to 420° F. in 15 seconds and in 30 seconds. The percent of transfer was calculated from spectrophotometric data obtained by measuring the difference between the amount of dyestuff originally on the paper and the amount remaining after the transfer process has been completed.

TABLE 2

| | % Transfer | |
|---|---|---|
| Temperature | 15 Seconds | 30 Seconds |
| 380° F. | 65.8 | 76.1 |
| 390° F. | 75.6 | 85.2 |
| 400° F. | 79.5 | 86.1 |
| 410° F. | 85.0 | 85.4 |
| 420° F. | 85.3 | 88.2 |
| 430° F. | 88 | 81.1 |

I claim:

1. A transfer sheet comprising a flexible nontextile substrate in sheet, roll or web form having a pattern effect printed thereon with a film of a dried ink formulation adapted for use in the heat transfer printing of synthetic textiles, said ink film containing one or more compatible sublimable dyestuffs, one of which is a yellow pyrazolone dye having the structure

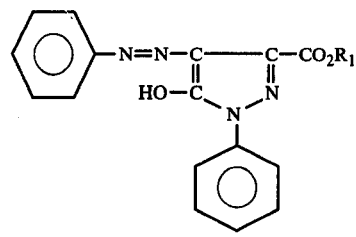

$R_1$ represents lower alkyl.

2. A transfer sheet according to claim 1 wherein $R_1$ is ethyl.
3. In a process for heat transfer printing nylon, polyester or acrylic textiles and fabrics, the improvement comprising heat transferring a yellow pyrazolone dye from a transfer sheet according to claim 2 to the nylon, polyester or acrylic fibers of the textile or fabric.
4. A transfer sheet according to claim 1 wherein $R_1$ is methyl.
5. In a process for heat transfer printing nylon, polyester or acrylic textiles and fabrics, the improvement comprising heat transferring a yellow pyrazolone dye from a transfer sheet according to claim 4 to the nylon, polyester or acrylic fibers of the textile or fabric.
6. In a process for heat transfer printing nylon, polyester or acrylic textiles and fabrics, the improvement comprising heat transferring a yellow pyrazolone dye from a transfer sheet according to claim 1 to the nylon, polyester or acrylic fibers of the textile or fabric.
7. Polyester fibers dyed by the heat transfer process of claim 6.
8. Acrylic fibers dyed by the heat transfer process of claim 6.
9. Nylon fibers dyed by the heat transfer process of claim 6.

UNITED STATES PATENT AND TRADEMARK OFFICE
CERTIFICATE OF CORRECTION

PATENT NO. : 4,139,343            Page 1 of 2
DATED : February 13, 1979
INVENTOR(S) : Russell I. Steiner It is certified that error appears in the above-identified patent and that said Letters Patent are hereby corrected as shown below:

In Table 1, in column 5, should read as follows:

TABLE 1

Light

Fade-O-Meter (60 hours)     5

|  | # 2A Wash | Perspiration Acid |
|---|---|---|
| Alteration | 4-5 | 4-5 |
| Staining | | |
| Acetate | 5 | 5 |
| Cotton | 5 | 5 |
| Nylon | 4-5 | 5 |
| Dacron (Polyester) | 5 | 5 |
| Orlon (Acrylic) | 5 | 5 |
| Wool | 5 | 5 |

Crock Test

Wet     5

Dry     5

Sublimation

340°F/30"     4

385°F/15"     3-4

UNITED STATES PATENT AND TRADEMARK OFFICE
CERTIFICATE OF CORRECTION

PATENT NO. : 4,139,343

DATED : February 13, 1979

INVENTOR(S) : Russell I. Steiner

It is certified that error appears in the above—identified patent and that said Letters Patent are hereby corrected as shown below:

At column 3, line 23, change "heated" to --heating--

In column 4, line 42, change "fee" to --free--

Signed and Sealed this

Twenty-fifth Day of September 1979

[SEAL]

Attest:

Attesting Officer

LUTRELLE F. PARKER

Acting Commissioner of Patents and Trademarks